3,467,730
THERMOSET CARBOXY COPOLYMER-AMINO ALDEHYDE-EPOXIDE RESIN COMPOSITIONS
Darrell D. Hicks, Louisville, Ky., assignor to Celanese Coatings Company, a corporation of Delaware
No Drawing. Continuation of application Ser. No. 811,536, May 7, 1959. This application Dec. 14, 1964, Ser. No. 418,310
Int. Cl. C08g 45/04, 45/10
U.S. Cl. 260—834
14 Claims

ABSTRACT OF THE DISCLOSURE

Coating compositions are prepared from carboxy containing copolymers, epoxide resins and aminoplast resins. In an example 37 g. of a 50% copolymer (72% styrene, 20% methyl acrylate and 8% acrylic acid) solution, 6.9 g. of a polyglycidyl ether of bisphenol A prepared from 1 mole of bisphenol A and 2.04 moles epichlorohydrin, and 8.3 g. of butylated urea-formaldehyde resin were blended. The resulting film drawn on glass was cured at 200° C. for 30 minutes.

---

This application is a continuation of application Ser. No. 811,536, filed May 7, 1959, now abandoned.

This invention relates to new coating compositions and to their preparation. More particularly, it relates to thermoset compositions based on carboxy polymers and epoxide resins, carboxy polymers being made from short chain alpha, beta, unsaturated monocarboxylic acids and ethylenically unsaturated monomers polymerizable therewith.

Carboxy copolymer-polyepoxide systems have been known for several years, as shown by U.S. Patent 2,604,464, and they are quite desirable coating compositions. This invention relates to methods of improving the system described in 2,604,464. It has been found that if alkylated urea or melamine aldehyde condensates are included in the carboxy-copolymer-polyepoxide reaction mixture, hardness, mar resistance, impact resistance and solvent resistance are all improved. With the addition of the aldehyde condensate, a harder, more brittle film would be expected rather than one having a much better flexibility and impact resistance. U.S. 2,604,464 shows the optimum acid level in the carboxy copolymer to be 5 to 15 percent based on the copolymer. It has been found that in these carboxy copolymer epoxide systems if 15 to 30 percent acid is employed in the copolymer, hardness, mar resistance, impact resistance and solvent resistance are improved over lower acid level copolymer.

Alkylated urea-aldehyde condensates can be made by various processes known in the art for the manufacture of urea formaldehyde resins. Similarly, the alkylated melamine-aldehyde condensates of different states of condensation, as long as they are soluble in the system, can be included in the copolymer-epoxide reaction mixture to form the new compositions. The alkylated condensates of aldehydes with organic ammonia derivatives result when the condensates are prepared in the presence of alcohols and the like, these solvents actually becoming part of the resulting product. This is illustrated by the products prepared in the presence of propyl, isopropyl, butyl, hexyl, octyl and other alcohols wherein the condensation reactions take place through alcohol ether groups rather than methylol groups, as is the case with non-alkylated urea aldehyde resins.

Since the alkylated urea- or melamine-aldehyde condensates can be at different stages of conversion when used in the carboxy-epoxy mixture, compositions of somewhat different characteristics can be obtained with products of different stages of conversion. Similarly, different aldehyde condensates may vary in their reactivity with various carboxy polymers. Moreover, when the reactants are combined, it may be that reactions of certain combinations of reacting materials take place at a more rapid rate than others. But in any event, the reaction products are valuable when made of proper proportions of reactants.

It is understood that various amines and amides will condense with aldehydes to form alkylated aldehyde-amine and aldehyde-amide condensates. Thus, urea, thiourea, and various substitute ureas and urea derivatives will react with aldehydes such as formaldehyde to form condensates, e.g., methylolureas, etc. Similarly, it is well known that melamine, for instance, melamine itself and substituted melamines such as benzoguanamine, will react with aldehydes, particularly formaldehyde, in the presence of alcohols to form the alkylated melamine-aldehyde condensates. Various other amines and amides can similarly be reacted with formaldehyde, etc., to form condensates which are amine-aldehyde or amide-aldehyde resins or condensates. Thus, other amino-triazines and amino-diazines will react with aldehydes to form condensates. Many of the present day commercial resins are prepared in the presence of alcoholic solvents which actually take part in the reaction. These known aldehyde condensates with ammonia derivatives are used for reacting with carboxy polymers and polyepoxides according to this invention.

The carboxy polymers reacted with the aldehyde condensates and polyepoxides, according to the present invention, are formed by reacting a polymerizable ethylenically unsaturated monomer with acrylic acid, methacrylic acid, or crotonic acid, i.e., alpha-beta unsaturated monocarboxylic acids having a single double bond and not more than four carbon atoms.

Copolymerized with the alpha-beta unsaturated acids are ethylenically unsaturated monomers copolymerizable therewith. Particularly important are vinyl aromatic compounds, for instance, styrene, the halostyrenes, etc., having a single vinyl group and free of other substituents capable of reacting with an unsaturated acid, i.e., a monofunctional vinyl aromatic compound. Also valuable are saturated alcohol esters of acrylic, methacrylic and crotonic acids. Examples of monofunctional vinyl aromatic monomers are isopropenyl toluene, the various dialkyl styrenes, ortho-, meta-, and para-chloro styrenes, bromo styrenes, and fluoro styrenes, the cyano styrenes, vinyl naphthalene. Among other monomers are the various alpha-substituted styrenes, e.g., alpha-methyl styrenes, alpha-methyl paramethyl styrenes, as well as various di-, tri-, and tetra-chloro, bromo, and fluoro styrenes. Acrylic, methacrylic, and crotonic esters of saturated alcohols include the methyl, ethyl, propyl, isopropyl, n-butyl, isobutyl, (sec)butyl, (tert)butyl, amyl, hexyl, heptyl, octyl, decyl, dodecyl, etc. esters of acrylic, methacrylic and crotonic acids. Preferred monomers include these alpha-beta unsaturated monocarboxylic acid esters of saturated monohydric alcohols, the acids having not more than four carbon atoms and the alcohols having not more than 20 carbon atoms and monofunctional vinyl aromatic compounds since, as will be shown, resulting films are more flexible.

Other known monomers which can be used in the preparation of the carboxy-polymer include vinyl aliphatic cyanides of not more than four carbon atoms, for example, acrylonitrile and methacrylonitrile. Unsaturated monohydric alcohol esters of saturated monocarboxylic acids are also intended wherein the alcohols contain a single double bond and not over three carbon atoms, and the acids have not more than 20 carbon atoms, for instance, vinyl acetate, vinyl stearate, and the allyl, methallyl and crotyl esters of propionic, butyric and other acids. And, of course, not only the monomers themselves, but mixtures of the monomers can be copolymerized with the alpha-beta unsaturated acids to form the carboxy polymer. However, when mixtures are employed a certain degree of selectivity must be exercised. Thus, it is preferred not to use vinyl acetate or similar esters with styrene and the like. Likewise, there will be certain combinations of monomer and crotonic acid which are undesirable. A desirable polymer includes acrylic acid, vinyl toluene, and methyl methacrylate, the desideratum being that the unsaturated acid is present in an amount of 1 to 30 percent by weight based on the total copolymer weight. Thus, based on 100 parts by weight of monomers, 1 to 30 parts are acrylic or other acid, and 99 to 60 parts by weight are one or more of the other monomers mentioned hereinbefore.

Since carboxy polymers are well known, their preparation need not be discussed at length herein. Polymerization is effected by conventional solution polymerization techniques using a peroxide catalyst such as benzoyl or ditertiary butyl peroxide and a temperature of 15° C. to 130° C. Suitable solvents are the known polar solvents, for example, diisobutyl ketone, methyl isobutyl ketone, hydroxy ethyl acetate, 2-ethoxy-ethyl acetate, propylene glycol methyl ether, diethyl ether of ethylene glycol, propylene glycol methyl ether butyl alcohol and isopropyl alcohol. In other words, the solvents are ethers, esters, ketones or alcohols, or mixtures of these with aromatic hydrocarbons such as xylene, the ethers, esters, ketones and alcohols having boiling points of 55° C. to 200° C. generally 120° C. to 160° C.

Among the polyepoxides which are used in admixture with the polymer and aldehyde condensate are glycidyl polyethers of polyhydric alcohols and polyhydric phenols prepared by reacting the alcohol or phenol with a halohydrin such as epichlorohydrin in the presence of an alkali. These are well-known epoxide resins described in such patents as U.S. 2,467,171, U.S. 2,538,072, U.S. 2,582,985, U.S. 2,615,007, U.S. 2,698,315 and U.S. 2,581,464. In addition to epoxy (i.e., oxirane) ethers, epoxy esters are included. Desirable epoxy esters can be made by the epoxidation of unsaturated esters by reaction with a peracid such as peracetic acid or performic acid, a desirable ester thus prepared being 3,4-epoxy-6-methylcyclohexylmethyl-3-4-epoxy - 6 - methylcyclohexanecarboxylate.

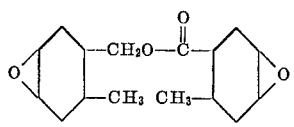

Other epoxy compounds included are, for example

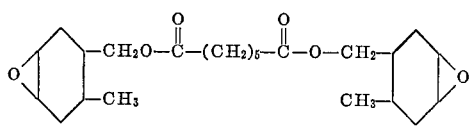

and the diglycidyl ether of triethylol propane, dicyclopentadiene diepoxide, bisepoxydicyclopentyl ether of ethylene glycol and epoxidized drying oils, such as epoxidized soya oil and the like of less than 20 carbon atoms.

In the preparation of the film forming compositions of the invention it is best to bring together and mix the nonaqueous solutions of the polymer, the polyepoxide, and the aldehyde condensate. The three components are mixed in amounts of 0.7 to 2 epoxide equivalents polyepoxide per carboxyl equivalent polymer, and 5 to 50 percent aldehyde condensate resin based on the entire solids composition. In other words, the combined polymer-epoxide-aldehyde condensate composition, excluding solvent, is 5 to 50 and preferably 20 to 40 percent aldehyde condensate. It is to be understood, however, that the amount of aldehyde condensate employed will vary somewhat with the composition of the carboxy polymer. Thus, the higher the aromatic content of the polymer, the more aldehyde condensate resin can be used. By an epoxide equivalent is meant the weight in grams of polyepoxide per epoxide group, where a carboxyl equivalent represents the weight in grams of copolymer per carboxyl group.

When the aldehyde condensate, the carboxyl polymer and the polyepoxide are combined, films prepared therefrom are heated to bring about a reaction between the reactants. The film forming compositions provided herein are heated at 130° C. to 200° C., and resulting film properties are much superior to those obtained without the aldehyde condensate.

The invention will now be illustrated in greater detail by means of the following specific example in which the preparation of typical carboxy polymers and some of the films are described. The first set of examples shows the improvement obtained through the use of urea and melamine aldehyde resins according to the invention. The second set shows the improvement obtained without the aldehyde condensate but with carboxy copolymers having more than 15 percent acid by weight in the systems of this invention. The polyepoxides used in the following examples were prepared by the condensation of various proportions of epichlorohydrin to bisphenol and subsequent dehydrohalogenation with sodium hydroxide. The table which follows indicates the ratio of epichlorohydrin to bisphenol used to prepare the polyepoxides, and in the examples which follow the polyepoxides will be referred to by their epoxide equivalents. Thus, an epoxide having an epoxide equivalent of 190 will be termed "Epoxide 190".

| Polyepoxide | Bisphenol, (mol) | Epichlorohydrin (mols) | Epoxide Equivalent |
|---|---|---|---|
| Epoxide 190 | 1 | 10 | 190 |
| Epoxide 327 | 1 | 2 | 327 |
| Epoxide 340 | 1 | 2.04 | 340 |

The urea-aldehyde resin employed is a commercial butylated urea-formaldehyde resin having the following properties: viscosity S–V; solids 60 percent in 87.5 percent butyl alcohol, and 12.5 percent xylene; and a naphtha tolerance of 350 percent. The melamine-aldehyde resin is a commercial butylated melamine-formaldehyde resin having the following properties: viscosity G–M; solids 50 percent in 80 percent butyl alcohol and 20 percent xylene; acid number of 0 to 2; and a mineral thinner tolerance of 65 to 105 percent (cubic centimeters of thinner tolerated by 10 grams of resin).

It should be understood that the invention is not to be limited to these particular examples or to the particular proportions of reactants employed since the examples are for the purpose of illustration only and are not intended to limit the invention.

EXAMPLE 1

(A) Copolymer preparation

| Material | Units | Weight (Grams) |
|---|---|---|
| Styrene | 72.0 | 504.0 |
| Methyl Acrylate | 20.0 | 140.0 |
| Acrylic Acid | 8.0 | 56.0 |
| Benzoyl Peroxide | 2.0 | 14.0 |
| Xylene | | 700.0 |

The xylene is charged into a 500 ml. round-bottomed, three-necked flask fitted with a mechanical agitator, thermometer, condenser and dropping funnel and the flask contents are heated to 115° C. In an Erlenmeyer flask, the styrene, methyl acrylate, acrylic acid and benzoyl peroxide are combined and agitated until all of the peroxide is in solution. This monomer-catalyst solution is added by means of the dropping funnel to the hot solvent, while stirring, over a period of one hour, maintaining the reaction temperature between 115° C. and 120° C. After all of the monomer-catalyst solution is added, reflux is continued for an additional three hours at a temperature of 126° C., after which the flask contents are cooled to room temperature. The 72/20/8 styrene/methyl acrylate/acrylic acid copolmer solution has a theoretical solids content of 50 percent, the theoretical carboxyl equivalent of the copolymer (based on solids) being 900.

(B) Cured compositions

In a suitable container 37.0 grams of the 50 percent copolymer solution of this example, 6.9 grams of Epoxide 340, 10.3 grams of ethylene glycol monoethyl ether acetate, and 8.3 grams of butylated urea-formaldehyde resin are blended with stirring. Films of the resulting solution are drawn down on glass panels to form 3.0 mil films. The film is cured by baking at 200° C. for thirty minutes, producing a tough film with good flexibility and excellent mar resistance.

EXAMPLE 2

Following the procedure of Example 1(A), a carboxy copolymer is prepared from the following:

| Material | Units | Weight (Grams) |
|---|---|---|
| Vinyl Toluene | 70.0 | 840 |
| Methyl Acrylate | 20.0 | 240 |
| Methacrylic Acid | 10.0 | 120 |
| Benzoyl Peroxide | | 30 |
| Xylene | | 1,200 |

Following part B of Example 1, 137.2 grams of the above copolymer solution (51 percent solids in xylene), 40 grams of Epoxide 327 (75 percent solids in xylene), 24.3 grams of xylene, and 48.5 grams of 2-ethoxy-ethyl acetate are blended and films drawn down on electrolytic tin plates. To 125 grams of this film forming composition 36 grams of a urea-formaldehyde resin solution (60 percent solids in 87.5 butanol and 12.5 xylene) and 18 grams of xylene are added and additional films prepared. In addition, films are made from the above compositions using one percent (based on total weight of solids) of benzyl trimethyl ammonium chloride as a catalyst.

EXAMPLE 3

Following the procedure of Example 1(A), a carboxy copolymer is prepared from the following:

| Material | Units | Weight (Grams) |
|---|---|---|
| Vinyl Toluene | 70.0 | 840 |
| Methyl Acrylate | 20.0 | 240 |
| Methacrylic Acid | 10.0 | 120 |
| Benzoyl Peroxide | | 30 |
| Xylene | | 1,200 |

Following Part B of Example 1, 78.5 grams of the above copolymer solution (51 percent solids in xylene), 10 grams of Epoxide 190 (100 percent solids), 18 grams of xylene, and 18 grams of 2-ethoxy-ethyl acetate are blended and films drawn down on electrolytic tin plates. To 124.5 grams of this film forming composition 35.8 grams of a urea-formaldehyde resin solution (60 percent solids in 87.5 percent butanol and 12.5 percent xylene) and 18 grams of xylene are added and additional films prepared as above. In addition, films are made from the above compositions using one percent (based on total weight of solids) of benzyl trimethyl ammonium chloride as a catalyst.

EXAMPLE 4

Following the procedure of Example 1(A), a carboxy copolymer is prepared from the following:

| Material | Units | Weight (Grams) |
|---|---|---|
| Vinyl Toluene | 65.0 | 390 |
| Ethyl Acrylate | 20.0 | 120 |
| Acrylic Acid | 15.0 | 90 |
| Benzoyl Peroxide | | 15 |
| Xylene | | 900 |

Following part B of Example 1, 23.7 grams of the above copolymer solution (50 percent solids in a 90/10 xylene/2-ethoxy-ethyl acetate mixture) 11.2 grams of Epoxide 327 (75 percent solids in xylene) and 15.1 grams of a 50/50 xylene/2-ethoxy-ethyl acetate mixture are blended and films drawn down on electrolytic tin plates. To 50 grams of this film forming composition 26.6 grams of the melamine formaldehyde resin solution described hereinbefore (50 percent solids in a 90/10 butanol/xylene mixture) and 6.7 grams of a 50/50 xylene/2-ethoxy-ethyl acetate mixture are added and additional films prepared. In addition, films are made from the above compositions using one percent (based on total weight of solids) of benzyl trimethyl ammonium chloride as a catalyst.

EXAMPLE 5

Following the procedure of Example 1(A), a carboxy copolymer is prepared from the following:

| Material | Units | Weight (Grams) |
|---|---|---|
| Vinyl Toluene | 42.0 | 294.0 |
| Methyl Acrylate | 42.0 | 294.0 |
| Methacrylic Acid | 16.0 | 112.0 |
| Benzoyl Peroxide | | 17.5 |
| Xylene-MIBK | 50/50 | 700.0 |

Following part B of Example 1, 24.8 grams of the above copolymer solution (49.2 percent solids in a 50/50 xylene/methyl isobutyl ketone) (MIBK), 10.4 grams of Epoxide 327 (75 percent solids in xylene) and 14.8 grams of a 50/50 xylene/2-ethoxy-ethyl acetate mixture are blended and films drawn down on electrolytic tin plates. To 50 grams of this film forming composition, 8.3 grams of the urea-formaldehyde resin solution (60 percent solids in 87.5 percent butanol and 12.5 percent xylene) and 4.2 grams of a 50/50 xylene/2-ethoxy-ethyl acetate mixture are added and additional films prepared as above. In the same manner, an additional film is prepared containing 26.7 grams of the melamine-formaldehyde resin solution (50 percent solids in a 90/10 butanol/xylene mixture and 6.6 grams of a 50/50 xylene/2-ethoxy-ethyl acetate mixture. Films are also prepared from the above compositions using one percent (based on total weight of solids) of benzyl trimethyl ammonium chloride as a catalyst.

EXAMPLE 6

Following the procedure of Example 1(A), a carboxy copolymer is prepared from the following:

| Material | Units | Weight (Grams) |
|---|---|---|
| Vinyl Acetate | 85.7 | 257.1 |
| Crotonic Acid | 14.3 | 42.9 |
| Benzoyl Peroxide | | 12.0 |
| Xylene/2-ethoxy-ethyl acetate | 50/50 | 300.0 |

Following part B of Example 1, 130 grams of the above copolymer solution (44.4 percent solids in a 50/50 xylene/Cellosolve acetate mixture), 56.0 grams of Epoxide 327 (75 percent solids in xylene), 39 grams of 2-ethoxy-ethyl acetate, and 25 grams of xylene are blended and films drawn down on electrolytic tin plates. To 50 grams of this film forming composition 8.3 grams of the urea-formaldehyde resin solution described hereinbefore (60 percent solids in 87.5 percent butanol and 12.5 percent xylene)

and 4 grams of 2-ethoxy-ethyl acetate are added and additional films prepared. In addition, films are made from the above compositions using one percent (based on the total weight of solids) of benzyl trimethyl ammonium chloride as a catalyst.

Comparisons showing properties obtainable with aldehyde-melamine or urea condensates in accordance with this invention are shown in Table A wherein properties of compositions containing no aldehyde condensate are compared with compositions in which the aldehyde-urea or melamine condensate is included, the compositions being products of Examples 1 through 6. The improvement in flexibility and mar resistance conferred by the use of the aldehyde condensate is outstanding.

2-ethoxy-ethyl acetate mixture), 58.7 grams of Epoxide 327 (75 percent solids in xylene), and 69.3 grams of 2-ethoxy-ethyl acetate are blended and films drawn down on electrolytic tin plates. To 100 grams of this film forming composition 16.7 grams of the urea-formaldehyde resin solution (60 percent solids in 87.5 percent butanol and 12.5 percent xylene) and 8.3 grams of 2-ethoxy-ethyl acetate are added and additional films prepared. In addition, films are made from the above compositions using one percent (based on total weight of solids) of benzyl trimethyl ammonium chloride as a catalyst.

The foregoing clearly illustrate the outstanding properties obtainable by the use of urea-aldehyde resins in accordance with this invention. The films containing no

TABLE A

| Composition of— | Percent Urea or Melamine Resin | Catalyst | Bake Schedule | Mar Resistance | One-Eighth Inch Bend | Impact Resistance |
|---|---|---|---|---|---|---|
| Example 2 | 0 | No | 30″ at 200° C | Fair | F | Failed 6 in./lb. bump test. |
| Example 2 | 30 UF | No | 30″ at 200° C | V. Good | P | Passed 28 in./lb. bump test. |
| Example 2 | 0 | Yes | 30″ at 150° C | Fair-Good | F | Failed 12 in./lb. bump test. |
| Example 2 | 30 UF | Yes | 30″ at 150° C | V. Good | P | Passed 28 in./lb. bump test. |
| Example 2 | 0 | Yes | 30″ at 180° C | Fair-Good | F | Failed 6 in./lb. bump test. |
| Example 2 | 30 UF | Yes | 30″ at 180° C | V. Good | P | Passed 28 in./lb. bump test. |
| Example 2 | 0 | Yes | 30″ at 200° C | Fair-Good | F | Failed 12 in./lb. bump test. |
| Example 2 | 30 UF | Yes | 30″ at 200° C | V. Good | P | Passed 28 in./lb. bump test. |
| Example 3 | 0 | Yes | 60″ at 180° C | Good | P | Failed 6 in./lb. bump test. |
| Example 3 | 30 UF | Yes | 60″ at 180° C | V. Good | P | Passed 28 in./lb. bump test. |
| Example 3 | 0 | Yes | 10″ at 200° C | Fair-Good | F | Failed 6 in./lb. bump test. |
| Example 3 | 30 UF | Yes | 10″ at 200° C | Good | | Passed 28 in./lb. bump test. |
| Example 3 | 0 | Yes | 20″ at 200° C | Fair-Good | F | Failed 6 in./lb. bump test. |
| Example 3 | 30 UF | Yes | 20″ at 200° C | V. Good | | Passed 28 in./lb. bump test. |
| Example 3 | 0 | Yes | 30″ at 200° C | Good | F | Failed 6 in./lb. bump test. |
| Example 3 | 30 UF | Yes | 30″ at 200° C | V. Good | | Passed 28 in./lb. bump test. |
| Example 4 | 0 | Yes | 30″ at 150° C | Fair-Good | P | Passed 28 in./lb. bump test. |
| Example 4 | 40 MF | Yes | 30″ at 105° C | V. Good | P | Passed 28 in./lb. bump test. |
| Example 5 | 0 | No | 30″ at 150° C | Poor | F | Failed 6 in./lb. bump test. |
| Example 5 | 40 UF | No | 30″ at 150° C | Good | P | Passed 28 in./lb. bump test. |
| Example 5 | 20 MF | No | 30″ at 150° C | Good | P | Passed 12 in./lb. bump test. |
| Example 5 | 0 | No | 30″ at 180° C | Fair | F | Failed 6 in./lb. bump test. |
| Example 5 | 40 UF | No | 30″ at 180° C | V. Good | P | Passed 28 in./lb. bump test. |
| Example 5 | 20 MF | No | 30″ at 180° C | V. Good | P | Passed 12 in./lb. bump test. |
| Example 5 | 0 | No | 30″ at 200° C | Fair-Good | F | Failed 6 in./lb. bump test. |
| Example 5 | 40 UF | No | 30″ at 200° C | Excellent | P | Passed 28 in./lb. bump test. |
| Example 5 | 20 MF | No | 30″ at 200° C | Excellent | P | Failed 6 in./lb. bump test. |
| Example 6 | 0 | Yes | 20″ at 180° C | Fair-Good | F | Failed 6 in./lb. bump test. |
| Example 6 | 20 UF | Yes | 20″ at 180° C | V. Good | P | Passed 28 in./lb. bump test. |
| Example 6 | 0 | Yes | 30″ at 180° C | Fair-Good | F | Failed 6 in./lb. bump test. |
| Example 6 | 20 UF | Yes | 30″ at 180° C | V. Good | P | Passed 28 in./lb. bump test. |
| Example 6 | 0 | Yes | 20″ at 200° C | Fair-Good | F | Failed 12 in./lb. bump test. |
| Example 6 | 20 UF | Yes | 20″ at 200° C | V. Good | P | Passed 28 in./lb. bump test. |
| Example 6 | 0 | Yes | 30″ at 200° C | Fair-Good | F | Failed 12 in./lb. bump test. |
| Example 6 | 20 UF | Yes | 30″ at 200° C | V. Good | P | Passed 28 in./lb. bump test. |
| Example 6 | 0 | No | 20″ at 180° C | Fair | F | Failed 6 in./lb. bump test. |
| Example 6 | 20 UF | No | 20″ at 180° C | V. Good | P | Passed 28 in./lb. bump test. |
| Example 6 | 0 | No | 20″ at 200° C | Fair | F | Failed 12 in./lb. bump test. |
| Example 6 | 20 UF | No | 20″ at 200° C | Good | P | Passed 28 in./lb. bump test. |
| Example 6 | 0 | No | 30″ at 200° C | Fair | F | Failed 12 in./lb. bump test. |
| Example 6 | 20 UF | No | 30″ at 200° C | Good | P | Passed 28 in./lb. bump test. |

F=Failed; P=Passed; UF=Isobutylated urea-formaldehyde resin; MF=Butylated melamine-formaldehyde resin; V. Good=Very Good.

EXAMPLE 7

Following the procedure of Example 1(A), a carboxy copolymer is prepared from the following:

| Material | Units | Weight (Grams) |
|---|---|---|
| Vinyl Toluene | 55.0 | 165.0 |
| Ethyl Acrylate | 20.0 | 60.0 |
| Acrylic Acid | 25.0 | 75.0 |
| Benzoyl Peroxide | | 7.5 |
| Solvent* | | 300.0 |

*50 percent 2-ethoxy-ethyl acetate–50 percent xylene.

Following part B of Example 1, 72 grams of the above copolymer solution (50 percent solids in a 50/50 xylene/ 2-ethoxy-ethyl acetate mixture), urea or melamine aldehyde resin did not pass six and twelve inch pound bump tests. Now, when the urea or melamine aldehyde resin, expected to make the film even more brittle, is added the films generally pass a twenty-eight inch pound bump test.

As indicated hereinbefore, the films described in U.S. 2,604,464 can also be improved if 15 to 30 percent acid is employed in the copolymer. This aspect of the invention can best be exemplified by the following examples. In this embodiment the copolymer and polyepoxide are employed in a ratio of 1 to 1.5 equivalents polyepoxide to 1 equivalent carboxy copolymer. Solutions of the two are mixed, and films cured at 125° C. or higher with a catalyst, or 150° C. to 200° C. without a catalyst. When catalysts are used they are usually basic materials, for example, amines, amine salts, quaternary ammonium hydroxides or salts such as quaternary ammonium salts. However, since primary and secondary amines enter into the reaction, preferred catalysts are tertiary amines, tertiary amine salts, and quaternary ammonium compounds, e.g., quaternary ammonium hydroxide, and quaternary ammonium salts. Examples are trimethyl amine, dimethylethyl amine, triethyl amine, ethyl dipropyl amine, benzyltrimethyl ammonium hydroxide, benzyltrimethyl ammonium chloride, benzyltrimethyl ammonium acetate, benzyltriethyl ammonium formate, tripropylbenzyl ammonium chloride, ethyl pyridine chloride, benzyl dimethyl ammonium hexoate, alpha-methylbenzyldimethyl ammonium 2-ethyl hexoate, etc. It is understood that these same catalysts can be used to accelerate the previously described compositions containing aldehyde condensates.

Still another aspect of this invention is that the higher acid copolymers (15 to 25 percent) are superior to those containing the lower level of acid (5 to 12 percent). This use of higher acid content copolymers in accordance with the invention has been found advantageous in the case of high temperature cures, or when a catalyst such as an organic quaternary ammonium salt is used. The results are best illustrated by means of the examples and tables which follow.

EXAMPLE 8

(A) Carboxy copolymer preparation

| Material | Units | Weight (Grams) |
|---|---|---|
| Styrene | 65.0 | 97.5 |
| Methyl Acrylate | 20.0 | 30.0 |
| Acrylic Acid | 15.0 | 22.5 |
| Benzoyl Peroxide | 2.0 | 3.0 |
| Xylene | | 112.5 |
| Methyl Isobutyl Ketone | | 37.5 |

Into a 500 ml. round-bottomed, three-necked flask fitted with a mechanical agitator, thermometer, condenser and dropping funnel are charged the xylene and methyl isobutyl ketone. The flask contents are heated to 115° C. In an Erlenmeyer flask, the styrene, methyl acrylate, acrylic acid and benzoyl peroxide are combined and agitated until all of the peroxide is in solution. This monomer-catalyst solution is added by means of the dropping funnel to the hot solvent while stirring over a period of one hour, maintaining the reaction temperature between 115° C. and 120° C. After all of the monomer-catalyst solution is added, reflex is continued for an additional three hours at a temperature of 126° C. after which the flask contents are cooled to room temperature. The 65/20/15 styrene/methyl acrylate/acrylic acid copolymer solution has a theoretical solids content of 50 percent, the theoretical carboxyl equivalent of the copolymer (based on solids) being 480.

(B) Cured film preparation

In a suitable container, 23.2 grams of the carboxy copolymer solution of this example (50 percent solids) and 11.2 grams of a 75 percent solution of Epoxide 327 in xylene are combined. These proportions represent a ratio of one carboxyl group for each epoxide group plus a weight excess of five percent of epoxide resin. The resinous solution is thinned to a 40 percent solids content with 6.0 grams of 2-ethoxyethanol acetate and 9.6 grams of xylene. With this solution is combined 0.3 gram of a 60 percent aqueous solution of benzyltrimethyl ammonium chloride. A three ml. film of this solution is drawn down on a glass plate and is cured by baking for thirty minutes at 150° C. The cured film exhibits excellent flexibility, is quite hard, and has very good mar resistance and adhesion properties.

EXAMPLE 9

(A) Carboxy copolymer preparation

| Material | Units | Weight (Grams) |
|---|---|---|
| Vinyl Toluene | 65.0 | 97.5 |
| Methyl Acrylate | 20.0 | 30.0 |
| Acrylic Acid | 15.0 | 22.5 |
| Benzoyl Peroxide | 2.0 | 3.0 |
| Xylene | | 112.5 |
| Methyl Isobutyl Ketone | | 37.5 |

A 50 percent solution of a 65/20/15 vinyl toluene/methyl acrylate/acrylic acid copolymer is prepared as in Example 8(A) from the components of this example. The theoretical carboxyl equivalent of the compolymer (based on solids) is 480.

(B) Cured film preparation

As described in Example 8(B), a film forming solution is prepared from 23.2 grams of the 50 percent copolymer solution of this example, 11.2 grams of a 75 percent xylene solution of Epoxide 327 combined with 8.0 grams of 2-ethoxy-ethanol acetate, 7.6 grams of xylene and 0.3 gram of a 60 percent aqueous solution of benzyltrimethyl ammonium chloride. A three ml. film drawn down on a glass plate and cured by baking for thirty minutes at 150° C. has properties identical to those of the film produced in Example 8(B).

EXAMPLE 10

(A) Carboxy copolymer preparation

| Material | Units | Weight (Grams) |
|---|---|---|
| Vinyl Toluene | 60.0 | 90.0 |
| Methyl Acrylate | 20.0 | 30.0 |
| Acrylic Acid | 20.0 | 30.0 |
| Benzoyl Peroxide | 2.0 | 3.0 |
| Xylene | | 112.5 |
| Methyl Isobutyl Ketone | | 37.5 |

Following the procedure of Example 8(A) a 50 percent solution of a 60/20/20 vinyl toluene/methyl acrylate/acrylic acid copolymer is made from the above named materials. The copolymer (based on solids) has a theoretical weight per carboxyl group of 360.

(B) Cured film preparation

As described in Example 8(B), 20.0 grams of the carboxy copolymer solution of this example and 13.4 grams of a 75 percent xylene solution of Epoxide 327 are combined in the presence of 6.0 grams of 2-ethoxyethanol acetate, 10.6 grams of xylene and 0.3 gram of a 60 percent aqueous solution of benzyltrimethyl ammonium chloride. A three ml. film of the solution is drawn down on a glass plate and is baked at 150° C. for thirty minutes. The cured film possesses excellent flexibility, and exhibits hardness, mar resistance, and adhesion properties slightly superior to those found for films in Examples 8(B) and 9(B).

EXAMPLE 11

(A) Carboxy copolymer preparation

| Material | Units | Weight (Grams) |
|---|---|---|
| Styrene | 60.0 | 90.0 |
| Methyl Acrylate | 20.0 | 30.0 |
| Acrylic Acid | 20.0 | 30.0 |
| Benzoyl Peroxide | 2.0 | 3.0 |
| Xylene | | 112.5 |
| Methyl Isobutyl Ketone | | 37.5 |

Using the procedure of Example 8(A), from the above named materials, a 50 percent solution of a 60/20/20 styrene/methyl acrylate/acrylic acid copolymer is made. The resulting copolymer solution is, however, uniformly cloudy at 25° C. Based on solids, the copolymer has a theoretical weight per carboxyl group of 360.

(B) Cured film preparation

Following the procedure of Example 8(B), 20.0 grams of the carboxy copolymer solution of this example and 13.4 grams of the 75 percent solution of Epoxide 327 in xylene are combined with 8.6 grams of 2-ethoxyethanol acetate and 8.0 grams of xylene in the presence of 0.3 gram of a 60 percent aqueous solution of benzyltrimethyl ammonium chloride. This mixture of materials forms a perfectly clear solution. From this solution a film is drawn down on a glass plate with a three ml. blade and is baked for thirty minutes at 150° C. The cured film has properties identical to those found for film produced in Example 10(B).

EXAMPLE 12

(A) Carboxy copolymer preparation

| Material | Units | Weight (Grams) |
|---|---|---|
| Vinyl Toluene | 55.0 | 82.5 |
| Methyl Acrylate | 20.0 | 30.0 |
| Acrylic Acid | 25.0 | 37.5 |
| Benzoyl Peroxide | 2.0 | 3.0 |
| Xylene | | 112.5 |
| Methyl Isobutyl Ketone | | 37.5 |

A 50 percent solution of a 55/20/25 vinyl toluene/methyl acrylate/acrylic acid copolymer is prepared from the above named materials following the procedure of Example 8(A). The copolymer, based on solids, has a theoretical weight per carboxyl group of 288.

(B) Cured film preparation

In accordance with the procedure of Example 8(B), 17.6 grams of the carboxy copolymer solution of this example and 15.0 grams of a 75 percent xylene solution of Epoxide 327 are combined with 8.9 grams of xylene, 10.5 grams of 2-ethoxyethanol acetate and 0.3 gram of a 60 percent aqueous solution of benzyltrimethyl ammonium chloride. From this solution, a film is drawn down on a glass plate with a three ml. blade and is baked for thirty minutes at 150° C. The cured film is very flexible, and exhibits exceptional hardness, mar resistance, and adhesion properties.

EXAMPLE 13

(A) Carboxy copolymer preparation

| Material | Units | Weight (Grams) |
|---|---|---|
| Vinyl Toluene | 72.0 | 864.0 |
| Methyl Acrylate | 20.0 | 240.0 |
| Acrylic Acid | 8.0 | 96.0 |
| Benzoyl Peroxide | 2.5 | 30.0 |
| Xylene | | 1,200.0 |

Following the procedure of Example 8(A), a 50 percent solution of a 72/20/8 vinyl toluene/methyl acrylate/acrylic acid copolymer is prepared from the above named components. The copolymer (based on solids) has a theoretical weight per carboxyl group of 900.

(B) Cured film preparation

As described in the procedure of Example 8(B), 28.4 grams of the carboxy copolymer of this example and 7.5 grams of a 75 percent solution of Epoxide 327 in xylene are combined with 9.1 grams of 2-ethoxyethanol acetate, 5.0 grams of diacetone alcohol and 0.3 gram of a 60 percent aqeuous solution of benzyltrimethyl ammonium chloride. From this solution a three ml. film is drawn down on a glass plate and is cured by baking at 150° C. for thirty minutes. The cured film exhibits flexibility and mar resistance properties which are definitely inferior to films of Examples 8(B) through 12(B). Hardness and adhesion properties are also inferior to the same films, but to a lesser degree.

EXAMPLE 14

(A) Carboxy copolymer preparation

| Material | Units | Weight (Grams) |
|---|---|---|
| Vinyl Toluene | 68.0 | 476.0 |
| Methyl Acrylate | 20.0 | 140.0 |
| Acrylic Acid | 12.0 | 84.0 |
| Benzoyl Peroxide | 2.5 | 17.5 |
| Xylene | | 700.0 |

In accordance with the procedure outlined in Example 8(B), a 50 percent solution of a 68/20/12 vinyl toluene/methyl acrylate/acrylic acid copolymer is prepared from the materials of this example. The copolymer (based on solids) has a theoretical weight per carboxyl group of 600.

(B) Cured film preparation

As described in the procedure of Example 8(B), 23.2 grams of the 50 percent copolymer solution of this example and 9.9 grams of a 75 percent solution of Epoxide 327 in xylene are combined with 14.9 grams of 2-ethoxyethanol acetate and 2.0 grams of diacetone alcohol in the presence of 0.3 gram of a 60 percent aqueous solution of benzyltrimethyl ammonium chloride. A three ml. film of the resulting solution is drawn down on a glass plate and is baked at 150° C. for thirty minutes. The resulting cured film has fair to good flexibility, good hardness and adhesion, and fair mar resistance properties.

EXAMPLE 15

To illustrate the improved properties of the cured films resulting from the use of the higher carboxyl content copolymers of this invention, from each of the film forming solutions of the preceding examples, films are rolled onto 3" x 5" electrolytic tin plate panels using a gelatin roller. These films are cured by baking at 150° C. for thirty minutes. The cured films are then subjected to a "wedge bent test." In this test the panel is bent over a mandrel to form a ⅛" bend with the planes of the panels on each side of the bend now being parallel to each other ⅛" apart. The bent panel is then subjected to impact, while being held in a wedge, so that the planes of the panel touch at one end and are ⅛" apart at the other end forming a tapered or wedge bend. The bend of the film is then examined for breakage after being immersed in acid solution of copper sulfate for one minute, the length of the break of the film being measured in mm.

The cured films are also subjected to an impact test with a Gardner Variable Impact Tester which uses a ½" round-nosed steel rod weighing two pounds dropping a maximum distance of 28 inches. After impact, the films are examined for flaking or cracking at the point of impact.

The table of this example indicates the results of these tests on the film forming solutions of the preceding examples.

| Film Forming Solution of— | Percent acid in Copolymer | Wedge Bend Test (mm. Breakage) | Bump Test (28 in./lb.) |
|---|---|---|---|
| Example 8(B) | 15 | 10 | Pass. |
| Example 9(B) | 15 | 10-13 | Pass. |
| Example 10(B) | 20 | 10-12 | Pass. |
| Example 11(B) | 20 | 10-15 | Pass. |
| Example 12(B) | 25 | 25-30 | Pass. |
| Example 13(B) | 8 | 48-50 | Fail. |
| Example 14(B) | 12 | 35-45 | Fail. |

The advantages of using high acid copolymers in the system are also illustrated by the following table.

TABLE B

| Epoxide of— | Percent Acid in Copolymer | Catalyst | Bake | Mar Resistance | ⅛ In. Bend Test* | Impact |
|---|---|---|---|---|---|---|
| Example 2 | 10 | No | 30″ at 200° C | Fair | F | Passed 6 in./lb. bump test. |
| Example 2 | 10 | Yes | 30″ at 200° C | Fair-Good | | Failed 12 in./lb. bump test. |
| Example 3 | 10 | No | 30″ at 200° C | Poor | F | Failed 6 in./lb. bump test. |
| Example 3 | 10 | Yes | 30″ at 200° C | Good | F | Failed 6 in./lb. bump test. |
| Example 5 | 16 | Yes | 30″ at 150° C | Good | P | Passed 28 in./lb. bump test. |
| Example 5 | 16 | Yes | 30″ at 180° C | Good | P | Passed 28 in./lb. bump test. |
| Example 5 | 16 | Yes | 30″ at 200° C | Good | P | Passed 28 in./lb. bump test. |
| Example 7 | 25 | No | 30″ at 150° C | Poor | F | Failed 6 in./lb. bump test. |
| Example 7 | 25 | Yes | 30″ at 150° C | V. Good | P | Passed 28 in./lb. bump test. |
| Example 7 | 25 | No | 30″ at 180° C | Poor | F | Failed 6 in./lb. bump test. |
| Example 7 | 25 | Yes | 30″ at 180° C | Exc | P | Passed 28 in./lb. bump test. |
| Example 7 | 25 | No | 30″ at 200° C | Good | P | Passed 28 in./lb. bump test. |
| Example 7 | 25 | Yes | 30″ at 200° C | Exc | P | Passed 28 in./lb. bump test. |

*F=Fail; P=Pass.

It will be noted that the films of high acid level polymers passed the 28 inch pound bump test whereas the films of Examples 13 and 14 of copolymers containing eight and twelve percent acid, respectively, did not.

Another feature of the invention is my discovery that polymers containing a short chain alkyl ester of acrylic, methacrylic or crotonic acid render films more flexible. Many of the preceding polymers contain this ester. The following examples illustrate this aspect of the invention.

EXAMPLE 16

(A) Carboxy copolymer preparation

| Material | Units | Weight (Grams) |
|---|---|---|
| Vinyl Toluene | 40.0 | 120.0 |
| Methyl Acrylate | 35.0 | 105.0 |
| Methacrylic Acid | 25.0 | 75.0 |
| Di-Tert-Butyl Peroxide | 4.0 | 12.0 |
| Xylene | | 123.0 |
| 2-ethoxyethanol Acetate | | 122.0 |

A 40/35/25 vinyl toluene/methyl acrylate/methacrylic acid 55 percent copolymer solution is prepared following the procedure of Example 8(A) but employing the components of this example. The copolymer (based on solids) has a theoretical carboxy equivalent of 344.

(B) Cured film preparation

In a suitable container, according to Example 8(B), 21.7 grams of the 40/35/25 vinyl toluene/methyl acrylate/methacrylic acid copolymer solution of this example and 13.4 grams of a 75 percent xylene solution of Epoxide 327 are combined with 14.9 grams of 2-ethoxyethanol acetate and 0.3 gram of a 60 percent aqueous solution of benzyltrimethyl ammonium chloride. From this solution, a three ml. film is drawn down on a glass plate and is baked for thirty minutes at 150° C. The resulting well cured film exhibits exceptional hardness, mar resistance and adhesion, and has excellent flexibility.

EXAMPLE 17

(A) Carboxy copolymer preparation

| Material | Units | Weight (Grams) |
|---|---|---|
| Vinyl Toluene | 80.0 | 120.0 |
| Acrylic Acid | 20.0 | 30.0 |
| Benzoyl Peroxide | 2.0 | 3.0 |
| Xylene | | 150.0 |
| Methyl Isobutyl Ketone | | 50.0 |

According to the procedure of Example 8(A), a 42 percent solution of an 80/20 vinyl toluene/acrylic acid copolymer is prepared. In the procedure of Example 8, in this case, the monomers/catalyst mixture is introduced into the solvent at a temperature of 125° C. to 135° C., the final reaction temperature being 132° C. The carboxy copolymer (based on solvents) has a theoretical weight per carboxyl group of 360.

(B) Cured film preparation

Following the procedure of Example 8(B), 23.8 grams of the copolymer solution of this example, 13.4 grams of the 75 percent xylene solution of Epoxide 327 and 0.3 gram of a 60 percent aqueous solution of benzyltrimethyl ammonium chloride are combined in the presence of 9.8 grams of 2-ethoxyethanol acetate and 3.0 grams of diacetone alcohol. From this solution, a three ml. film is drawn down on a glass plate and is cured by baking at 150° C. for thirty minutes. The cured film has excellent hardness, mar resistance, and adhesion properties, but flexibility is inferior to films of Example 15.

The foregoing examples show the unexpected improvement in film properties obtainable through the use of alkylated urea or melamine aldehyde resins. However, another important aspect of the invention is the advantage of using vinyl toluene, not mentioned in U.S. 2,604,464, instead of styrene. Solvent selection is important, and vinyl toluene imparts to the copolymer much more desirable solubility properties. The use of vinyl toluene in many systems can mean the difference between an aromatic solvent system and a system requiring a polar solvent. This is best illustrated by the following solvent tolerance tests. Tolerances were measured at 25° C. by starting with 50 percent concentrations of the copolymers in a mixture of 75 percent xylene and 25 percent methyl isobutyl ketone and thinning until the copolymer solution becomes cloudy, indicating incompatibility. The styrene-containing copolymer of Example 8(A) (50 percent solids) on addition of xylene becomes cloudy at 39 to 40 percent solids, whereas the 50 percent solids copolymer solution of Example 9(A) containing vinyl toluene can be reduced to 28 to 29 percent solids before becoming cloudy.

Considering now the higher acid content copolymers which require a more polar solvent, the copolymer solution of Example 11(A) was cloudy when cooled to 25° C. so that a stronger solvent was used in part B of that example. Thus, using a mixture of 75 percent xylene and 25 percent methyl isobutyl ketone, the tolerance is definitely above 50 percent solids, whereas the corresponding vinyl toluene copolymer solution (20 percent acrylic acid) of Example 10(A) was reduced to 37 to 38 percent solids before becoming cloudy. The 25 percent acrylic acid copolymer solution of Example 12(A) containing vinyl toluene was made as a clear 50 percent solids solution in a mixture of 75 percent xylene and 25 percent methyl isobutyl ketone. Yet in the case of the styrene copolymer, even the 20 percent acrylic acid level copolymer was cloudy at 50 percent solids. The 25 percent acrylic acid copolymer is even more insoluble. Thus, the vinyl toluene copolymer is unique.

While this invention has particular application to the preparation of film forming compositions, it is not necessarily limited thereto. The carboxy copolymer can be made in the presence of a reactive solvent and castings, pottings and the like can also be made, as described and claimed in the copending application Ser. No. 788,046, filed Jan. 21, 1959, now abandoned.

I claim:

1. A heat-convertible, solvent thinned, resinous composition of matter particularly adapted for use in preparing coating compositions which can be cured by baking at elevated temperatures to give durable protective films, said resinous composition comprising:
   (a) 0.7 to 2 equivalents of a polyepoxide having more than one 1,2 epoxy group per molecule;
   (b) one equivalent of a carboxy copolymer comprising
      (1) 5 to 25 weight percent of a short chain alpha-beta monounsaturated monocarboxylic acid having not more than four carbon atoms, and
      (2) a different monoethylenically unsaturated monomer copolymerizable therewith;
   (c) an amino aldehyde resin selected from the group consisting of
      (1) alkylated urea-aldehyde condensates and
      (2) alkylated melamine-aldehyde condensates, the amount of aldehyde condensate being 5 to 50 weight percent of the copolymer-polyepoxide-condensate composition; and
   (d) sufficient non-aqueous solvent to give the desired consistency to said compositions.

2. A process for the preparation of infusible, insoluble compositions which comprises mixing, heating, and reacting at a temperature of 130° C. to 200° C., a polyepoxide having more than one 1,2 epoxy group per molecule, an alkylated melamine-aldehyde condensate and a carboxy copolymer, wherein 0.7 to 2 epoxide equivalents polyepoxide are used per carboxyl equivalent copolymer, wherein the carboxy copolymer is a copolymer of an alpha-beta monounsaturated monocarboxylic acid having not more than four carbon atoms and a different monomer copolymerizable therewith, wherein the carboxy copolymer is 1 to 30 percent monocarboxylic acid by weight, and wherein the combined epoxide-aldehyde condensate-copolymer composition is 5 to 50 weight percent aldehyde condensate.

3. A heat-convertible, solvent thinned, resinous composition of matter particularly adapted for use in preparing coating compositions which can be cured by baking at elevated temperatures to give durable protective films, said resinous composition comprising
   (a) 0.7 to 2 equivalents of a polyepoxide selected from the group consisting of
      (1) glycidyl polyethers of polyhydric alcohols,
      (2) glycidyl polyethers of polyhydric phenols,
      (3) dicyclopentadiene diepoxide,
      (4) bis-epoxy-dicyclopentyl ether of ethylene glycol, and
      (5) 3,4-epoxy - 6 - methylcyclohexylmethyl-3-4-epoxy-6-methylcyclohexanecarboxylate,
   (b) one equivalent of a carboxy copolymer comprising:
      (1) 5 to 25 weight percent of a short chain alpha-beta monounsaturated monocarboxylic acid having not more than four carbon atoms, and
      (2) a different monoethylenically unsaturated monomer copolymerizable therewith,
   (c) an amino aldehyde resin selected from the group consisting of
      (1) alkylated urea-aldehyde condensates and
      (2) alkylated melamine-aldehyde condensates, the amount of aldehyde condensate being 5 to 50 weight percent of the copolymer-polyepoxide-aldehyde condensate composition, and
   (d) sufficient non-aqueous solvent to give the desired consistency to said compositions.

4. The composition of claim 3 wherein the polyepoxide is the diglycidyl ether of a dihydric phenol, and wherein the amino-aldehyde resin is an alkylated melamine-aldehyde condensate.

5. The composition of claim 3 wherein the alkylated aldehyde condensate is a butylated urea-formaldehyde resin, wherein the alpha-beta unsaturated monocarboxylic acid is methacrylic, wherein the monomer, copolymerizable therewith includes vinyl toluene, butyl methacrylate and methyl methacrylate, and wherein the polyepoxide is a glycidyl polyether of a dihydric phenol having a 1,2-epoxy equivalency greater than one and a weight per epoxide less than 500.

6. A process for the preparation of infusible, insoluble compositions which comprises mixing, heating, and reacting at a temperature of 130° C. to 200° C., a polyepoxide, an alkylated melamine-aldehyde condensate and a carboxy copolymer, wherein the polyepoxide is a diglycidyl ether of a polyhydric phenol, wherein 0.7 to 2 epoxide equivalents polyepoxide are used per carboxyl equivalent copolymer, wherein the carboxy copolymer is a copolymer of an alpha-beta monounsaturated monocarboxylic acid having not more than four carbon atoms and a different monomer copolymerizable therewith, wherein the carboxy copolymer is 1 to 30 percent monocarboxylic acid by weight, and wherein the combined epoxide-aldehyde condensate-copolymer composition is 5 to 50 weight percent aldehyde condensate.

7. A method of making an organic coating on surfaces which comprises simultaneously mixing as the sole essential reacting constituents in the presence of a non-aqueous organic solvent,
   (1) a vinyl copolymer having an acid number between 8 and 234 which is a copolymer of monomers consisting essentially of
      (a) a member of the group consisting of acrylic acid, acrylic acids substituted in the alpha position with lower alkyl, and
      (b) an ethylenically unsaturated monomer selected from the group consisting of styrene, styrenes substituted with lower alkyl in the alpha position, alkyl esters of acrylic acid and alkyl esters of acrylic acid substituted in the alpha position with lower alkyl,
   (2) an epoxy compound characterized by the presence of at least one epoxy group per molecule and selected from the group consisting of polyglycidyl ethers of aromatic polyhydroxy compounds, epoxidized unsaturated oils, 3,4-epoxy-6-methylcyclohexylmethyl-3,4-epoxy - 6-methylcyclohexane carboxylate, and dicyclopentadiene dioxide, and
   (3) an amino resin selected from the group consisting of urea-formaldehyde and melamine-formaldehyde condensates, the amount of said vinyl copolymer and epoxy compound being such that said composition contains approximately equivalent amounts of epoxy-reactive groups and epoxy groups, coating a metal substrate with the resultant mixture and then baking the substrate at a temperature between 150° and 200° C. for 60 to 10 minutes.

8. A method of making an organic coating as set forth in claim 7 in which the vinyl copolymer is a copolymer containing acrylic acid.

9. A method of making an organic coating as set forth in claim 7 in which the vinyl copolymer is a copolymer containing methacrylic acid.

10. A method of making an organic coating as set forth in claim 7 in which the vinyl copolymer is a copolymer containing styrene.

11. A method of making an organic coating as set forth in claim 7 in which the vinyl copolymer is a copolymer containing a-methyl styrene.

12. A method of making an organic coating as set forth in claim 7 in which the vinyl copolymer is a copolymer containing methyl methacrylate.

13. A method of making an organic coating on surfaces as set forth in claim 7 in which the epoxy compound is the polyglycidyl ether of 2,2'-di(p-hydroxyphenyl) propane.

14. A coating composition comprising an organic solvent solution having dissolved therein (1) a copolymer produced by solution polymerization of ethylenically unsaturated monomers comprising from 10–50% by weight of copolymerized monoethylenically unsaturated ester containing at least one terminal aliphatic hydrocarbon chain of from 1–20 carbon atoms, from 10–72% by weight of copolymerized vinyl aromatic compound selected from the group consisting of styrene, vinyl toluene and mixtures thereof, and copolymerized monoethylenically unsaturated carboxylic acid in an amount providing from 1–30 equivalent percent of free carboxyl radical, (2) epoxy compound containing at least one 1,2-epoxy group present in an amount to supply at least 0.2 equivalent of oxirane radical per equivalent of carboxyl radical in said copolymer, and (3) as the curing agent for said mixture of components (1) and (2), an amount sufficient to cure said mixture of the reaction product of urea with formaldehyde reacted with a $C_3$–$C_8$ alcohol to provide a solvent-soluble, heat-hardenable urea resin.

References Cited

UNITED STATES PATENTS

| | | | |
|---|---|---|---|
| 3,156,740 | 11/1964 | Bussell | 260—834 |
| 3,215,756 | 11/1965 | Lombardi | 260—834 |
| 2,604,464 | 7/1952 | Segall et al. | 260—837 |
| 2,798,861 | 7/1957 | Segall et al. | 260—837 |
| 2,839,514 | 6/1958 | Shokal et al. | 260—834 |
| 2,897,174 | 10/1959 | Rothrock et al. | 260—836 |
| 2,918,391 | 12/1959 | Hornibrook | 260—848 |
| 3,105,826 | 10/1963 | Jaggard | 260—837 |

SAMUEL H. BLECH, Primary Examiner

PAUL LIEBERMAN, Assistant Examiner

U.S. Cl. X.R.

117—124, 132; 260—23, 31.4, 31.6, 32.8, 33.2, 33.4, 33.6, 837